(12) United States Patent
Hamburgen

(10) Patent No.: US 9,606,587 B2
(45) Date of Patent: Mar. 28, 2017

(54) INSULATOR MODULE HAVING STRUCTURE ENCLOSING ATOMSPHERIC PRESSURE GAS

(71) Applicant: Google Inc., Mountain View, CA (US)

(72) Inventor: William Hamburgen, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/662,030

(22) Filed: Oct. 26, 2012

(65) Prior Publication Data

US 2014/0118927 A1    May 1, 2014

(51) Int. Cl.
*G06F 1/20* (2006.01)

(52) U.S. Cl.
CPC .............. *G06F 1/20* (2013.01); *G06F 1/203* (2013.01)

(58) Field of Classification Search
CPC ..................................................... G06F 1/20
USPC ..... 174/30, 117 AS, 117 R, 15.1, 16.1, 16.3; D13/179; 361/679.55, 679.48, 679.49, 361/679.54, 704
See application file for complete search history.

(56) References Cited

U.S. PATENT DOCUMENTS

| | | | | |
|---|---|---|---|---|
| 3,586,102 A * | 6/1971 | Gilles | ............................ | 165/186 |
| 3,741,292 A * | 6/1973 | Aakalu et al. | ............ | 165/104.21 |
| 4,092,697 A * | 5/1978 | Spaight | .......................... | 361/718 |
| 4,155,402 A * | 5/1979 | Just | ................................ | 165/46 |
| 4,262,045 A * | 4/1981 | Cheng et al. | .................... | 428/69 |
| 4,284,674 A * | 8/1981 | Sheptak | .......................... | 428/69 |
| 4,563,375 A * | 1/1986 | Ulrich | .......................... | 428/35.3 |
| 4,618,517 A * | 10/1986 | Simko, Jr. | ..................... | 428/34.4 |
| 4,636,416 A * | 1/1987 | Kratel et al. | ..................... | 428/69 |
| 4,669,632 A * | 6/1987 | Kawasaki et al. | ............. | 428/172 |
| 4,825,089 A * | 4/1989 | Lindsay | ....................... | 250/515.1 |
| 4,997,032 A * | 3/1991 | Danielson et al. | .............. | 165/46 |
| 5,018,328 A * | 5/1991 | Cur et al. | ...................... | 52/406.2 |
| 5,107,649 A * | 4/1992 | Benson et al. | ............... | 52/309.4 |
| 5,270,092 A * | 12/1993 | Griffith | ...................... | B32B 3/12 |
| | | | | 428/116 |
| 5,792,539 A * | 8/1998 | Hunter | ........................... | 428/72 |
| 6,037,033 A * | 3/2000 | Hunter | ........................... | 428/72 |
| 6,055,155 A | 4/2000 | von Gutfeld | | |
| 6,055,156 A * | 4/2000 | von Gutfeld | .................. | 361/690 |
| 6,333,847 B1 * | 12/2001 | Katsui et al. | ............. | 361/679.55 |

(Continued)

OTHER PUBLICATIONS

"Aerogel", CABOT, retrieved on Jan. 8, 2013 from www.cabot-corp.com/Aerogel, 3 pages.

(Continued)

*Primary Examiner* — Jenny L Wagner
*Assistant Examiner* — Michael E Moats, Jr.
(74) *Attorney, Agent, or Firm* — Brake Hughes Bellermann LLP

(57) ABSTRACT

A device including a heat-absorbing component, and one or more heat-generating components. At least one heat-generating component is located in proximity to an inner surface of the heat-absorbing component, and a gap exists between the at least one heat-generating component and the inner surface of the heat-absorbing component. The device further including an insulator, located in the gap, including an insulator structure enclosing atmospheric pressure gas, where the atmospheric pressure gas has a thermal conductivity lower than air.

17 Claims, 6 Drawing Sheets

(56) References Cited

U.S. PATENT DOCUMENTS

| | | | |
|---|---|---|---|
| 6,358,595 B1 | 3/2002 | Kobayashi | |
| 6,418,017 B1* | 7/2002 | Patel et al. | 361/700 |
| 6,809,413 B1* | 10/2004 | Peterson | B81B 7/0067 |
| | | | 257/680 |
| 6,859,364 B2* | 2/2005 | Yuasa | A01N 25/10 |
| | | | 165/104.33 |
| 7,545,644 B2* | 6/2009 | Fedorov | 361/699 |
| 7,729,108 B2* | 6/2010 | Rehmann et al. | 361/679.09 |
| 8,000,103 B2* | 8/2011 | Lipp et al. | 361/702 |
| 8,120,915 B2* | 2/2012 | Pautsch et al. | 361/699 |
| 8,174,828 B2* | 5/2012 | Tilton et al. | 361/689 |
| 8,227,729 B2* | 7/2012 | Sorabji et al. | 219/411 |
| 2002/0191373 A1 | 12/2002 | Williams et al. | |
| 2003/0043541 A1* | 3/2003 | Yuasa et al. | 361/687 |
| 2003/0157284 A1* | 8/2003 | Tanimoto et al. | 428/36.1 |
| 2005/0100728 A1 | 5/2005 | Ristic-Lehmann et al. | |
| 2005/0270746 A1* | 12/2005 | Reis | 361/708 |
| 2007/0115635 A1* | 5/2007 | Low et al. | 361/700 |
| 2009/0154113 A1* | 6/2009 | MacDonald | 361/720 |
| 2009/0155646 A1 | 6/2009 | Endo et al. | |
| 2010/0028649 A1* | 2/2010 | Trouilhet et al. | 428/309.9 |
| 2010/0083417 A1 | 4/2010 | Alder et al. | |
| 2010/0218932 A1* | 9/2010 | Fischer et al. | 165/185 |
| 2010/0263540 A1* | 10/2010 | Hashida et al. | 96/151 |
| 2011/0059275 A1* | 3/2011 | Stark | 428/34 |
| 2011/0242757 A1* | 10/2011 | Tracy | G06F 1/1616 |
| | | | 361/679.55 |
| 2011/0247781 A1* | 10/2011 | Vafai et al. | 165/46 |
| 2011/0296771 A1* | 12/2011 | Miller et al. | 52/171.3 |
| 2013/0189022 A1* | 7/2013 | Elliot et al. | 403/230 |

OTHER PUBLICATIONS

"Cabot Corporation's Enova® Aerogel Enables New Aerolon Thermal Insulation Coatings", CABOT, Apr. 30, 2012, 3 pages.

"Coatings", CABOT, retrieved on Jan. 8, 2013 from www.cabotcorp.com/aerogel/coatings, 2 pages.

"Insulated glazing", from Wikipedia, the free encyclopedia, Jan. 8, 2013, 7 pages.

"Meet the Next Generation of Thermal Insulation Coatings", retrieved on Jan. 8, 2013 from https://www.tnemec.com/news/AerolonRelease.aspx, 4 pages.

"Thermal Conductivity of Gases", Engineers Edge, retrieved on Jan. 8, 2013 from www.engineersedge.com/heat_transfer/thermal-conductivity-gases.htm, 2 pages.

"Thermal Wrap TW350, 600, 800", CABOT Aerogel, Product Features, 2011, 1 page.

Griffith, et al, "Gas-Filled Panels: An Update on Applications in the Building Thermal Envelope", Proceedings of the BETEL Fall Symposium, Nov. 14, 1995, 14 pages.

Kohler, "Gas Filled Panels", Apr. 26, 2006, retrieved on Jan. 8, 2013 from gfp.lbl.gov/default.htm, 1 page.

International Preliminary Report on Patentability for PCT Patent Application No. PCT/US2013/065961, mailed on Dec. 12, 2014, 7 pages.

International Search Report and Written Opinion for International Application No. PCT/US2013/065961, mailed Feb. 14, 2014, 11 pages.

Extended European Search Report for EP Application No. 13849427.3, mailed Oct. 31, 2016, 9 pages.

* cited by examiner

INSULATOR MODULE HAVING STRUCTURE ENCLOSING ATOMSPHERIC PRESSURE GAS

BACKGROUND

In laptop computers and other electronics, hot components near the inner case wall often create external hotspots that can be uncomfortable or dangerous to the user. In other words, when an electrical component is being used, the electrical component may generate heat. This electrical component may transfer heat to the enclosure of the device, thereby to the user, which essentially creates a hotspot on the enclosure that may be uncomfortable or dangerous to the user especially in the case of a metal enclosure.

The International Electrotechnical Commission (IEC) provides a set of standards for electrical devices, which includes a maximum temperature limit for areas on the device itself. Typically, most electronic manufacturers adhere to this requirement by limiting the temperature below the maximum temperature provided by the IEC. One particular example of an IEC standard indicates that if the device has a metal surface (e.g., easily conducts heat) the metal surface has to be held at a lower temperature than a plastic surface. For example, with heated metal surfaces, the heat can quickly be transferred to the user touching the hot metal surface; therefore, the metal surface can feel relatively hot even at a relatively low temperature. However, metal surfaces for electrical devices are typically used because they can quickly transfer heat from the hot electrical component, thereby keeping the hot electrical component cooler. As such, in some situations, a hotspot on the metal enclosure may occur over the hot electrical component. Further, in the event that an electrical component (e.g., CPU) is processing video graphics, the metal case enclosure may be very hot in the area of the CPU.

Generally, in order to avoid a hot spot on the metal case enclosure, a system designer may create an air gap between the hot component and the enclosure. The size of the air gap may be relatively proportional to the usefulness of the insulation, e.g., the larger the air gap between the hot component and the enclosure, the better the insulation. As such, the size of the air gap may be considered a critical item for determining the overall thickness of the device. With that said, in the area of consumer electronics, smaller electronic devices may be more marketable. In contrast, bulkier consumer electronics may have a perception of being lower quality. Therefore, there may be an incentive to design an electronic device as small as possible, which greatly affects the air gap, thereby affecting the heat transferred to the user.

SUMMARY

The details of one or more implementations are set forth in the accompanying drawings and the description below. Other features will be apparent from the description and drawings, and from the claims.

A device including a heat-absorbing component, and one or more heat-generating components. At least one heat-generating component is located in proximity to an inner surface of the heat-absorbing component, and a gap exists between the at least one heat-generating component and the inner surface of the heat-absorbing component. The device further including an insulator, located in the gap, including an insulator structure enclosing atmospheric pressure gas, where the atmospheric pressure gas has a thermal conductivity lower than air.

The heat-absorbing component may include an enclosure of the device, and the at least one heat-generating component may include a computer processing unit (CPU) of the device. The gap has a size such that conduction dominates heat transfer across the gap.

The insulator structure may include a flexible pouch structure having a three-sided seal. The insulator structure may include a flexible pouch structure having a four-sided seal. The insulator structure may include a first tray structure bonded with a second tray structure, and each of the first tray structure and the second tray structure may include a flat portion with raised edges. The insulator structure may include a tray structure covered with a film material, and the film material may be a non-metallic film, where the tray structure may include a flat portion with raised edges. The insulator structure may include a tube structure having end seals. Also, at least a portion of the insulator structure may be embedded in the enclosure.

The atmospheric pressure gas may include xenon. Also, the atmospheric pressure gas may be infused with at least one of helium and hydrogen. The insulator structure may enclose a secondary atmospheric pressure gas having a thermal conductivity lower than air. The secondary atmospheric pressure gas may include argon.

The insulator structure may include a first layer and a second layer, the first layer including a flexible polymer-based material, and the second layer including a metallic-based material.

An insulator for a device including a flexible insulator structure having a size that fits within a gap existing between at least one heat-generating component and an inner surface of a heat-absorbing component, and atmospheric pressure gas located within the flexible insulator structure, where the atmospheric pressure gas has a thermal conductivity lower than air. The gap has a size such that conduction dominates heat transfer across the gap. The insulator structure may include a flexible pouch structure having a three-sided seal or a four-sided seal.

An insulator for a device may include a means for enclosing atmospheric pressure gas within a gap existing between at least one heat-generating component and an inner surface of a heat-absorbing component, where the atmospheric pressure gas has a thermal conductivity lower than air.

The means for enclosing atmospheric pressure gas may include a flexible pouch structure having a three-sided seal or a four-sided seal. The means for enclosing atmospheric pressure gas may include a first tray structure bonded with a second tray structure, and each of the first tray structure and the second tray structure may include a flat portion with raised edges.

DETAILED DESCRIPTION

The embodiments provide an insulation solution that is effective for reducing heat transfer across relatively small gaps for electrical devices, in which conduction dominates over radiation and convection in terms of heat transfer. For example, the embodiments may provide an insulator including an insulator structure enclosing an atmospheric pressure gas or near-atmospheric pressure gas having a thermal conductivity lower than air. The insulator may be provided within a gap that exists between at least one heat-generating component and an inner surface of an enclosure of a device, where the device may be a laptop computer, a personal computer, a smart phone, or generally any type of electrical device having one or more components that generate heat, and where a user may come into contact with a heated surface. In one specific embodiment, the atmospheric pressure gas may include Xenon, which has a thermal conductivity 20% of air and may be effective for reducing heat transfer when conduction dominates over convection and radiation. However, the embodiments encompass the use of other inert gases such as Krypton, refrigerant gases, and other gases with a low thermal conductivity (e.g., lower than air).

Generally, the embodiments may encompass many different types of insulator structures enclosing an atmospheric pressure gas having a thermal conductivity lower than air, e.g., a means for enclosing atmospheric pressure gas. In one example, the insulator structure (or means for enclosing atmospheric pressure gas) may include a thin-walled structure capable of housing a gas (e.g., see FIG. 4). In a more detailed embodiment, the insulator structure (or means for enclosing atmospheric pressure gas) may be a flexible pouch structure having a three-sided seal such as a flexible polymer or polymer-metal pouch similar to a juice container (e.g. catsup/mustard single serving pouch) (e.g., see FIG. 5A). Other forms may include a flexible pouch structure having a four-sided seal (e.g., see FIG. 5B), a dual tray structure (e.g., see FIG. 5C), a tray structure covered with a film/foil (e.g., see FIG. 5D), and a tube structure having end seals similar to a toothpaste casing (e.g., see FIG. 5E). Also, the insulator may be at least partially embedded into the enclosure (e.g., see FIG. 6). When embodied into an electrical device, these types of insulators may provide good insulation across gaps that are relatively small in order to reduce heat transfer when conduction dominates over radiation and convection (e.g., see FIG. 7). These and other features are further described below.

Figure 1:
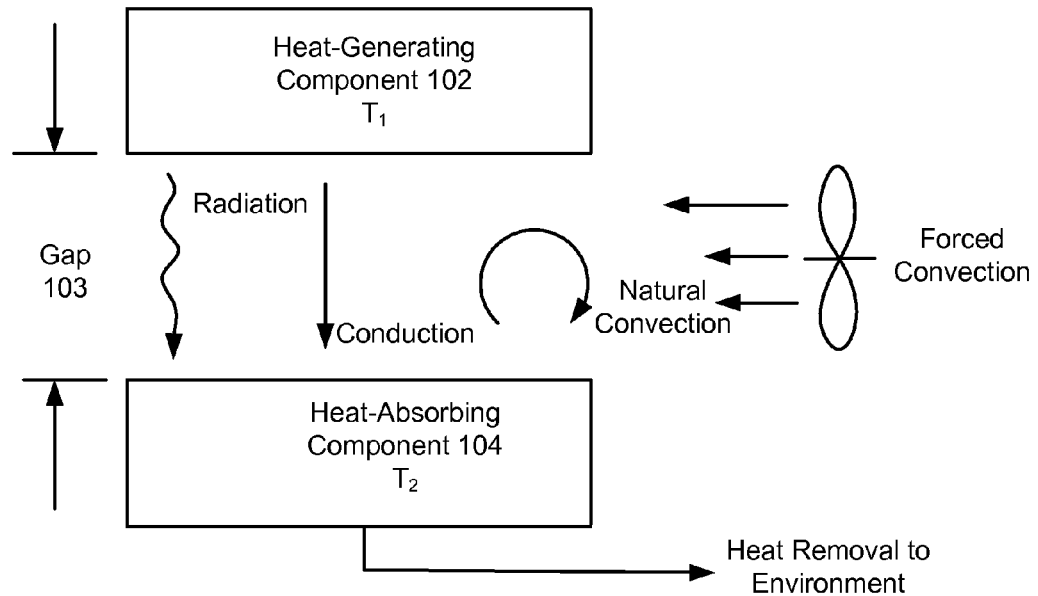
FIG. 1 illustrates different modes of heat transfer across a gap according to an embodiment.

FIG. 1 illustrates different modes of heat transfer across a gap according to an embodiment. Generally, heat transfer may be accomplished through radiation, conduction, natural convection, and/or forced convection. For example, a heat-generating component 102 having a relatively high temperature ($T_1$) may transfer heat via a gap 103 to a heat-absorbing component 104 having a relatively lower temperature ($T_2$) via radiation, conduction, natural convection, and/or forced convection. The heat-generating component 102 may be any type of component capable of generating heat due to the operation of the component itself. In the context of electrical devices, the heat-generating component 102 may include a computer processing unit (CPU) or generally any type of component that generates heat when employed within the electrical device. The heat-absorbing component 104 may be any type of component capable of absorbing heat. In the context of electrical devices, the heat-absorbing component 104 may be a case or enclosure capable of housing the heat-generating component 102. For example, the heat-absorbing component 104 may be a metal or non-metal case that houses several electrical components.

Also, the heat-generating component 102 may include a temperature ($T_1$) that is higher than the temperature ($T_2$) of the heat-absorbing component 104. Naturally, the heat generated by the heat-generating component 102 may transfer to the lower temperature component, e.g., the heat-absorbing component 104, via radiation, conduction, natural convection, and/or forced convection, as further explained below.

Generally, heat transfer by radiation is driven by the difference between the absolute temperature of a heat emitting body (e.g., the heat-generating component 102) and one or more cooler surrounding regions (e.g., the heat-absorbing component 104), which may absorb heat from electromagnetic radiation that is derived from black body emissions, where the emissions may be a function of the absolute temperature of the heat-generating component 102. With emissivity=1 (e.g., perfect black body radiation), conduction through air dominates in the gap 103 when the gap 103 is smaller than approximately 3.7 mm, and as emissivity decreases, this crossover point increases proportionately.

Heat transfer by conduction is the transfer of heat through the material itself such as a liquid, gas, or a solid at a rate proportional to the thermal conductivity of the material, which may be relatively high for materials such as a diamond, copper, and aluminum, and lower for liquid or gas materials. Stated another way, heat transfer by conduction is the transfer of heat through the material of the gap, which may be air or any type of gas, liquid, or solid.

Heat transfer by convection is the transfer of heat from one place to another by the movement of fluids (e.g., gases, liquids). In particular, forced convection is a mechanism, or type of transport in which fluid motion is generated by an external source such as a fan. In contrast, heat transfer by natural convection (also referred to as free convection), occurs due to temperature differences between the heat-generating component 102, and the heat-absorbing component 104 which affect the density, and thus relative buoyancy, of the fluid. Convection cells are formed due to density differences within a body, where there is a circulated pattern of fluid cooling the body. In particular, the fluid surrounding the heat source receives heat, becomes less dense and rises, and then the surrounding, cooler fluid then moves to replace it. For instance, the density of a fluid decreases with increasing temperature because of volumetric expansion, which may induce natural convection flow. However, this depends on the configuration of the components, as explained below.

For example, with respect to natural convection between parallel horizontal plates in air (e.g., where the hotter plate is on top), this configuration is inherently stable because the lighter fluid is already above the cooler heavier fluid. There is no tendency for this system to move away from the state of equilibrium, and any heat transfer between the plates will be accomplished via conduction. With respect to natural convection between parallel vertical plates in air, the gap 103 has to be approximately 10 mm for natural convection to begin to matter. For example, convection cells cannot form when the gap 103 is less than 10 mm. As such, conduction and radiation will dominate over convection from component to case when the size of the gap 103 is less than 10 mm, and conduction will dominate over convection and radiation from component to case when the size of the gap 103 is less than 3.7 mm.

For 1 mm gaps (which are common in laptop computers or other electrical devices), conduction also dominates heat transfer over radiation and convection. As such, as discussed herein, the size of the gap 103 when conduction dominates over radiation and convection may be approximately any size less than 3.7 mm, and may be occasionally referred to as a small gap. Also, the inventor has recognized that the size of the gap 103 affects the amount of conduction heat flow across the gap 103, as discussed with respect to FIG. 2.

Figure 2:
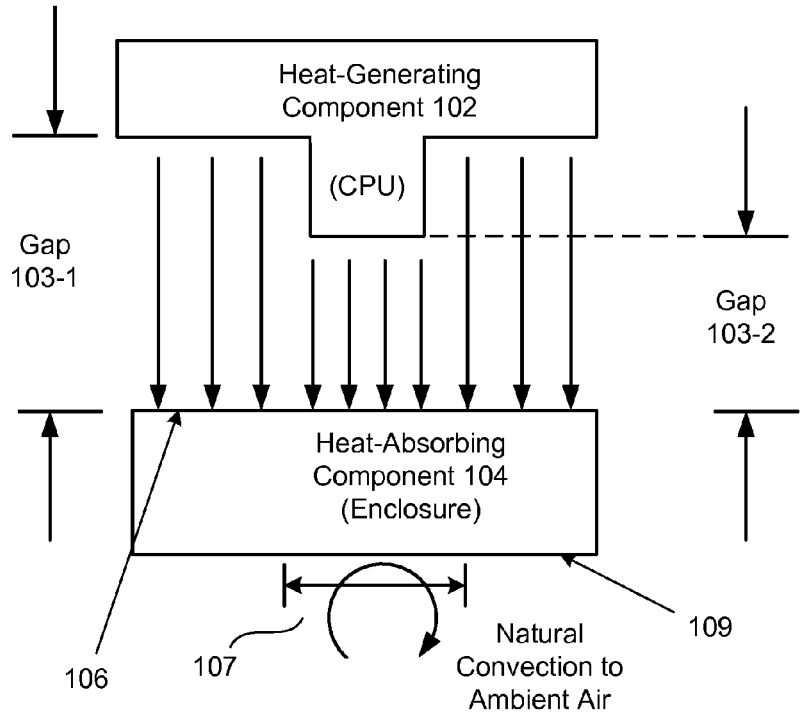
FIG. 2 illustrates heat transfer by conduction across the gap according to an embodiment.

FIG. 2 illustrates heat transfer by conduction across the gap 103 according to an embodiment. In this example, the heat-generating component 102 may include a CPU, and the heat-absorbing component 104 may include an enclosure that houses the CPU. A first gap 103-1 may exist between a component (or portion) of the heat-generating component 102 and an inner surface 106 of the enclosure, and a second gap 103-2 smaller than the first gap 103-1 may exist between the CPU portion and the inner surface 106 of the heat-absorbing component 104. A relatively larger conduction heat flow may exist across the second gap 103-2, and a relatively smaller conduction heat flow may exist across the first gap 103-1. As such, the heat transferred across the second gap 103-2 may result in a hotspot 107, which is a relatively hot/warm region on an outer surface 109 of the enclosure where a user may make contact. The heat transferred to the enclosure (e.g., the heat-absorbing component 104) may be subsequently transferred to the surrounding ambient air via natural convection.

Figure 3:
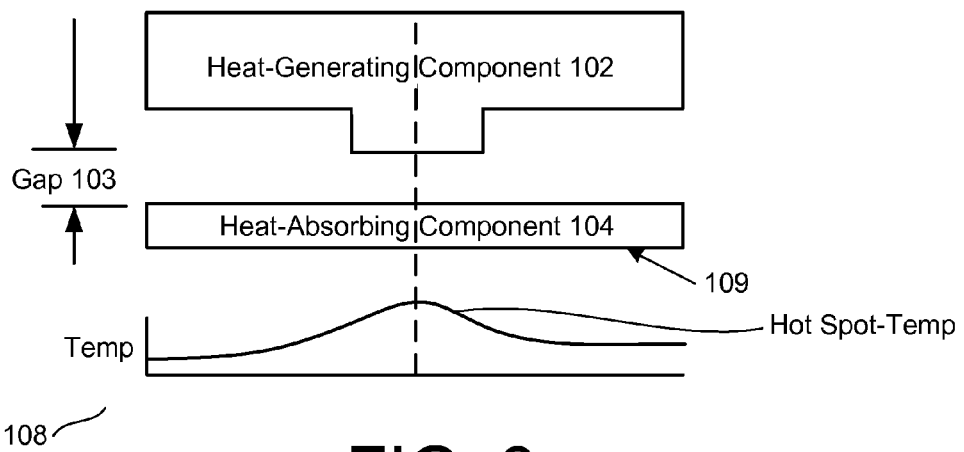
FIG. 3 illustrates a temperature distribution on a surface of an enclosure without an insulator provided in the gap according to an embodiment.

FIG. 3 illustrates a temperature distribution 108 on the outer surface 109 of the heat-absorbing component 104 without an insulator provided in the gap 103 according to an embodiment. For instance, the temperature distribution 106 shows the difference in temperature across the outer surface 109 of the heat-absorbing component 104, which increases towards the area of the hotspot 107 where the gap 103 is smaller.

An insulator may be provided in the gap 103 to reduce the amount of heat transfer when a higher amount of heat exists than what is desired. However, as demonstrated above, the size of the gap 103 affects the type of heat transfer (e.g., conduction, convection, or radiation), which affects the type of insulation used to counter the heat transfer. In one example, a hard vacuum surrounded by a metal surface may be provided as an insulator, which is effective for eliminating convection and conduction. However, the problem of insulating with a vacuum is that for any kind of flat application atmospheric pressure tends to collapse the container walls. This may be countered by posts or pillars, however, the posts or pillars typically end up becoming a major heat leak, reducing the performance of the vacuum insulator.

For relatively larger gaps, adding insulation such as fiberglass is relatively effective because the fiberglass breaks up the ability of the convection cells to form, thereby preventing heat transfer by convection. As such, with larger gaps, insulation such as fiberglass or low density styrene foam, or urethane forms is useful because they reduce heat transfer by convection. Although these types of insulators are effective to prevent heat transfer by convection/radiation, they still allow conduction flow through the gaps that's filling the insulation, and then through the insulation material itself. Because most solids have higher thermal conductivity as compared to gases, conventional insulators typically use a low density material such as loose fiberglass or aerogel that is mostly gas. Also, with respect to reducing heat transfer by radiation, solutions such as MLI (multi-layer insulation) have been utilized. MLI may consist of many layers of a reflective material in tiny gaps for purposes of insulating in vacuums or with large temperature differences (e.g., some exotic automotive under-hood applications).

However, the difficulty increases when the gaps are relatively small such as approximately less than 3.7 mm, and increases when the gaps are even smaller such as approximately equal to or less than 1 mm. Generally, within electrical devices such as laptop computers, personal computers, and smart phones, smaller gaps (e.g., >1 mm) are more common due to market pressures of creating smaller and slender devices. In this context, for small gaps, convection cells cannot form. Therefore, preventing heat transfer by convection is no longer important. Essentially, the small gap contains stagnant air, and if at least a portion of the stagnant air in the gap 103 is replaced by an insulator such as a solid, it makes matters worse because the solid-based insulator has higher thermal conductivity than air. Therefore, insulating small gaps with foam and/or fiberglass will not be effective for reducing heat transfer across the gap 103. As such, instead of placing a solid based material for use as an insulator in the gap 103, the embodiments encompass providing an insulator structure enclosing an atmospheric pressure gas with a thermal conductivity lower than air for use as an insulator, as further discussed below.

Figure 4:
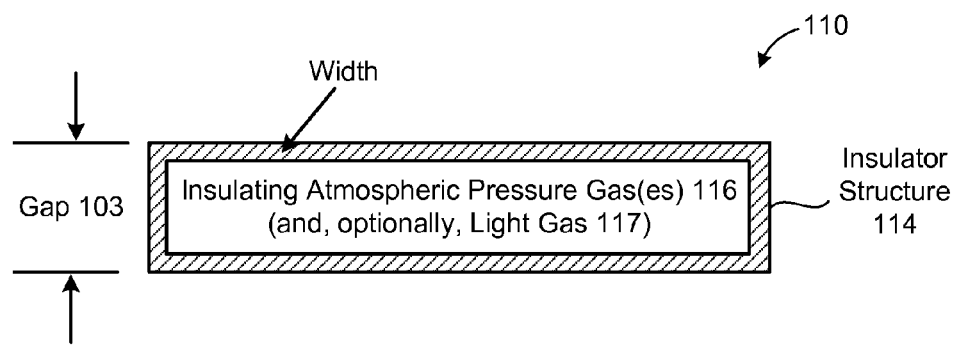
FIG. 4 illustrates an insulator provided within the gap that is effective for reducing heat transfer when the gap is relatively small such that conduction dominates heat transfer according to an embodiment.

FIG. 4 illustrates an insulator 110 provided within the gap 103 that is effective for reducing heat transfer when the gap 103 is relatively small such that conduction dominates heat transfer according to an embodiment. For example, the insulator 110, located in the gap 103, may include an insulator structure 114 enclosing one or more atmospheric pressure gases 116, where the one or more atmospheric pressure gases 116 may have a thermal conductivity lower than air. In one embodiment, the atmospheric pressure gas 116 may include Xenon, which has a thermal conductivity 20% of air and may be effective for reducing heat transfer when conduction dominates over convection and radiation. However, the embodiments encompass the use of other inert gases such as Krypton, refrigerants, and other gases that have a thermal conductivity lower than air. Generally, the insulator structure 114 may be a container capable of housing a gas, where the container has a thickness (Width). As such, when employed with an electrical device such as a laptop computer (shown in more detail with respect to FIG. 8), the insulator 110 may reduce local heat transfer, reduce localized hotspots, and improve the user experience. However, the insulator 110 may be applied to any application where a planar source (e.g., the heat-generating component 102) and a heat sink (e.g., the heat-absorbing component 104) meet across a gap. In one example, the insulator 110 may protect any kind of heat-sensitive component within an enclosure.

It is noted that the insulator 110 may be filled with one type of atmospheric pressure gas 116 such as a Xenon, or include multiple types of atmospheric pressure gases 116 such as Xenon and Argon, as further explained below. In addition, it is noted that the insulator 110 (over time) may include other types of gases, which have permeated into the insulator structure 114, which is also further discussed below.

The insulator structure 114 may include a single material that is arranged to enclose the atmospheric pressure gas 116 having a thermal conductivity lower than air. For instance, the insulator structure 114 may include a flexible material such as a polymer or polymer-metal based material, or a metal-based material such as steel or aluminum, for example. Also, the insulator structure 114 may include a plurality of layers such one or more layers of the polymer or polymer-metal based material and one or more layers of the metal-based material. In some examples, one or more of the layers may be bonded to itself or another layer using a sealant such that a cavity exits inside the structure, where the cavity is then filled with the atmospheric pressure gas 116 having a thermal conductivity lower than air.

With respect to the width of the insulator structure 114, ideally the material(s) that constitute the insulator structure 114 has zero thickness, e.g., all the space is reserved for the atmospheric pressure gas 116. Generally, since the material(s) that constitute the insulator structure 114 have a higher thermal conductivity than the atmospheric pressure gas 116, the material(s) may be considered a thermal short-circuit that reduces the gap by a corresponding thickness (Width). For the gap 103 having a length less than 1 mm, the thickness of the material(s) are critical, and, in one embodiment, the thickness of the insulator structure 114 may be in the range of 12-120 microns to be effective for reducing heat transfer when conduction dominates over radiation and convection.

Also, according to another embodiment, the insulator structure 114 may include not only the one or more atmospheric pressure gases 116 having a thermal conductivity lower than air such as Xenon (and Argon), but also a light gas 117 such as helium or hydrogen, for example. In words, the Xenon-filled or other gas-filled insulator structure 114 may be infused with a relatively small amount of the light gas 117 such as helium or hydrogen. In contrast to Xenon or the other atmospheric pressure gases discussed herein, helium and hydrogen have a relatively high thermal conductivity, which may be six times that of air. As such, one of ordinary skill in the art may consider it counter-intuitive to include the light gas 117 in the insulator structure 114, which is designed to prevent heat transfer across the gap 103 when conduction dominates over convection and radiation. For instance, the inclusion of the light gas 117 actually increases thermal conductivity—not reduces it.

However, the inclusion of the light gas 117 into the insulator structure 114 containing Xenon and/or other atmospheric gasses discussed herein allows a person to detect the leakage of the insulator structure 114 in a fairly easy manner. For example, helium or hydrogen has a property that it escapes very easily, and will transfer through even solid metals at a measurable rate. In particular, mass spectrometer helium leak detectors have been developed to detect minis-cule quantities of helium/hydrogen leakage by applying a vacuum to the outside of a vessel filled with helium/hydrogen, and then using the mass spectrometer helium leak detector to detect individual molecules or atoms. As such, according to an embodiment, a certain percentage of the light gas 117 may be infused into the insulator structure 114 for performing one or more non-destructive tests with the insulator structure 114, and to determine if the insulator structure 114 includes the proper quantity of the atmospheric pressure gas 116.

In one particular embodiment, the atmospheric pressure gas 116 may be intentionally spiked with the light gas 117 such as approximately 2% of the light gas 117 by weight. The 2% of the light gas 117 may increase the thermal conductivity of the atmospheric pressure gas 116 by approximately 20%. However, because the light gas 117 escapes relatively easier, the insulator 110 of the embodiments will actually improve over the lifespan of the insulator 110 as the light gas 117 disappears from the insulator structure 114 over time. Also, the inclusion of the light gas 117 may provide an effective mechanism for performing a leak test on the insulation material at the end of the production line.

As indicated above, the insulator structure 114 may include multiple types of atmospheric pressure gases 116 having a thermal conductivity lower than air. For example, the insulator structure 114 may include a secondary atmospheric pressure gas (e.g., Argon) besides the primary atmospheric gas 116 (e.g., Xenon). This secondary atmospheric pressure gas may include Argon or a similar type of gas, which has a higher permeation rate than the primary atmospheric pressure gas (Xenon). Also, the permeation rate of the secondary atmospheric pressure gas may be similar to a permeation rate of gases that are outside the insulator structure 114 (e.g., similar permeation rate to nitrogen and/or oxygen). However, the thermal conductivity of the secondary atmospheric pressure gas may be sufficiently low to not have an excessive effect on the overall thermal conductivity of the gas mixture (e.g., lower than air). Permeation of a particular gas is driven by the partial pressure on each side of a barrier. A particular gas moves from a region with a higher partial pressure to a region of lower partial pressure, regardless of the total pressure. This is why a helium-filled latex balloon quickly deflates even though the total pressure inside and outside the balloon is very similar.

For example, assuming that the primary atmospheric pressure gas 116 is Xenon, Xenon has a relatively large molecule, which has a low permeation rate through the insulator structure 114. In other words, Xenon tends to stay within the insulator structure 114, and not leak outside the structure. However, other gases such as oxygen and nitrogen can permeate into the insulator structure 114 (e.g., oxygen and nitrogen have a smaller molecule and may permeate into the insulator structure 114), and may increase the size of the insulator structure 114 and cause the structure to swell. The enlarged size of the insulator structure 114 may interface with surrounding components. For example, over time, the insulator structure 114 may result in an oversized pouch (e.g., the increased size due to the addition of the oxygen and/or nitrogen), which may affect the operation of the device or other components within the device.

As such, according to the embodiments, the insulator structure 114 may include Xenon (and perhaps the light gas 117), but also a secondary atmospheric pressure gas such as Argon, which has a thermal conductivity lower than air (e.g., about 50% lower, but higher than Xenon) and a permeation rate similar to nitrogen and oxygen. Therefore, the insulator 110 may include two types of atmospheric pressure gases having a thermal conductivity lower than air. However, the secondary atmospheric pressure gas (e.g., Argon) may have a higher thermal conductivity than Xenon (or any other similar atmospheric pressure gas 116), but still sufficient enough to be effective for reducing heat transfer across the gap 103. Further, the secondary atmospheric pressure gas may have a permeation rate higher than Xenon, and, perhaps, similar to oxygen and/or nitrogen. As a result, as the oxygen and/or nitrogen permeate into the insulator structure 114, the secondary atmospheric pressure gas (e.g., Argon) is permeating out of the insulator structure 114, thereby keeping the insulator structure 114 around the same (or substantially similar) size.

FIGS. 5A-5E illustrate the insulator 110 having the insulator structure 114 enclosing the atmospheric pressure gas 116 according to a number of different embodiments. Although FIGS. 5A-5E illustrate specific embodiments of the insulator structure 114, the embodiments may include any type of structure enclosing the atmospheric pressure gas 116, e.g., the general insulator structure of FIG. 4.

Figure 5A:
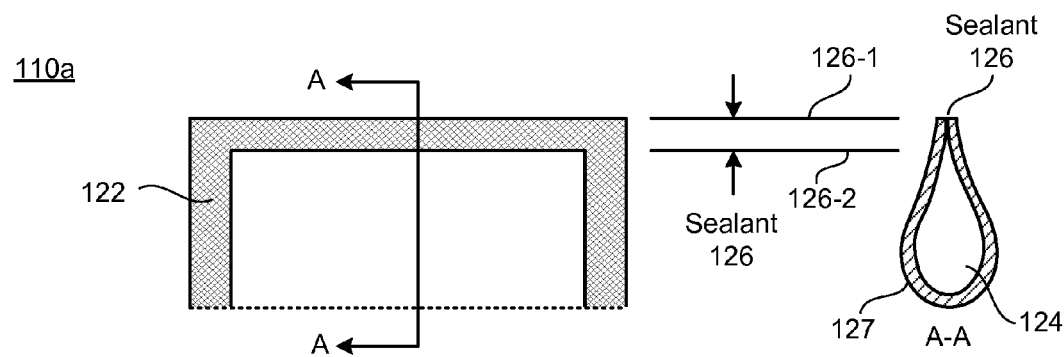
FIG. 5A illustrates a top view and a cross-sectional view of an insulator including a flexible pouch structure having a three-sided pouch seal according to an embodiment.

In one example, FIG. 5A illustrates a top view and a cross-sectional view of an insulator 110a including a flexible pouch structure having a three-sided pouch seal according to an embodiment. The flexible pouch structure may include a polymer or polymer-metal material that is arranged in a "pouch" similar to a condiment container (e.g. catsup/mustard single serving pouch), which is heat sealed along three-sides using a sealant 126. The left portion of FIG. 5A illustrates the top view of the flexible pouch structure, and the right portion of FIG. 5A illustrates a cross-sectional view taken across the section line A-A. In this example, a single portion 127 of the polymer or polymer-metal material may be folded in half, and the sealant 126 is used along three-sides of a heat-sealed area 122 of the insulator 110a in order to seal the pouch structure, thereby creating a pouch. The sealant 126 may include an adhesive, solder, or any type of sealant known in the art that is effective for sealing a polymer, polymer-metal, or metal material. The bursting strength of the seals may be strong enough to survive transient overpressure when the system is dropped on a hard surface. As a result, a cavity 124 inside the flexible pouch structure exits, which is filled with the one or more atmospheric pressure gases 116 having a thermal conductivity lower than air, e.g., Xenon, Argon, as well as possibly the light gas 117.

According to one embodiment, the flexible pouch material may include a plurality of layers such as a printable polymer outer-layer, an aluminum layer, inner polymer layer, and one or more adhesive or heat-sealed layers. The flexible pouch structure may be formed by placing continuous rolls of the flexible pouch material through a machine which heat seals the plurality of layers, and seals the three-sides of the flexible pouch structure, thereby producing the flexible pouch structure having a three-sided seal similar to a single serving mustard package.

According to another embodiment, the flexible pouch material may include a polymer or polymer-based layer and a barrier layer such as metal, glass, or a ceramic. For example, a polymer or polymer-based layer may be considered highly permeable to the atmospheric pressure gas 116 used in the insulation layer, and permeable to gases in general. As such, in order to reduce the ability of the atmospheric pressure gas 116 to permeate through the package, the package film incorporates a barrier layer that is developed from metal, glass, or a ceramic. Metals, glasses, and ceramics are generally considered impermeable to gasses. In one particular embodiment, the barrier layer may include a thin layer of aluminum foil, where the thickness of the aluminum foil still permits the insulator structure 114 to be flexible (e.g., in the range of 7 microns to 25 microns thick). In another embodiment, the barrier layer may include a glass or ceramic or silicon dioxide layer. However, in the glass or ceramic or silicon dioxide layer approach, this layer tends to crack, which allows the gas to pass through the cracks in the film without going through the glass or ceramic or silicon dioxide material, and then those leaks dominate the transport of gas out of the insulator structure 114.

Figure 5B:
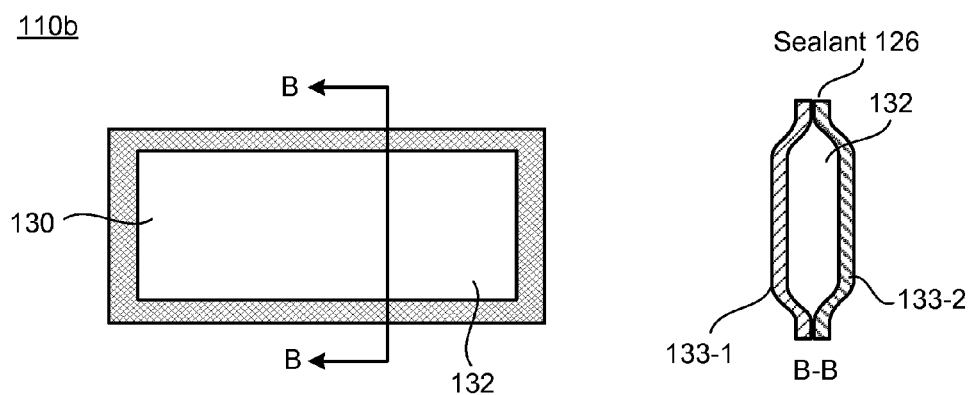
FIG. 5B illustrates a top view and a cross-sectional view of an insulator including a flexible pouch structure having a four-sided pouch seal according to an embodiment.

FIG. 5B illustrates a top view and a cross-sectional view of an insulator 110b including a flexible pouch structure having a four-sided seal according to an embodiment. The flexible pouch structure of the insulator 110b may include the flexible pouch material, described above with reference to the insulator 110a. However, the flexible pouch material is sealed along four-sides using the sealant 126. The left portion of FIG. 5B illustrates the top view of the pouch structure having the four-sided seal, and the right portion of FIG. 5B illustrates a cross-sectional view taken across the section line B-B. In this example, two portions (e.g., a first portion 133-1 and a second portion 133-2) of the flexible pouch material may be sealed together using the sealant 126 along four sides of a heat-sealed area 130 of the insulator 110b in order to seal the pouch structure, thereby creating a pouch. As a result, a cavity 132 inside the pouch structure exists, which is filled with the one or more atmospheric pressure gases 116 having a thermal conductivity lower than air, e.g., Xenon, Argon, as well as possibly the light gas 117.

The insulator 110a and the insulator 110b may be applied as insulators to provide insulation over a specified area, e.g. such as a heat-generating component 102 that generates a relatively large amount of heat that creates a hotspot that may contact with the user.

Figure 5C:
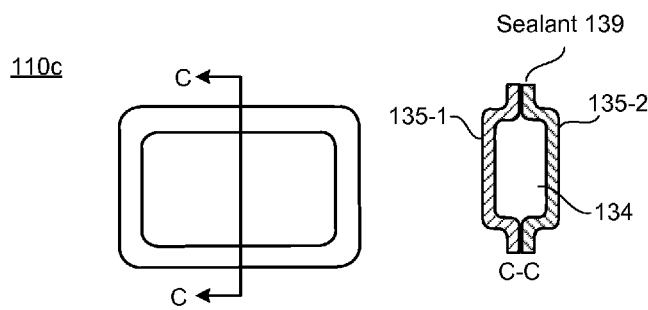
FIG. 5C illustrates a top view and a cross-sectional view of an insulator including a dual-tray structure according to an embodiment.

FIG. 5C illustrates a top view and a cross-sectional view of an insulator 110c including a dual-tray structure according to an embodiment. For example, the left portion of FIG. 5C illustrates a top view of the dual-tray structure, and the right portion of FIG. 5C illustrates a cross-sectional view taken across the section line C-C. In this example, a first tray structure 135-1 and a second tray structure 135-2 may be bonded together such that a cavity 134 exists between the first tray structure 135-1 and the second tray structure 135-2, where the cavity 134 is filled with the one or more atmospheric pressure gases 116 having a thermal conductivity lower than air (and possibly the light gas 117). The first tray structure 135-1 and the second tray structure 135-2 may be bonded together with a sealant 139. The sealant 139 may include the types of sealants with respect to sealant 126, or a solder weld, for example. The second tray structure 135-2 may be symmetrical to the first tray structure 135-1, or vice versa.

Further, each of the first tray structure 135-1 and the second tray structure 135-2 may include a flat portion with raised edges. Also, each of the first tray structure 135-1 and the second tray structure 135-2 may be composed of aluminum, stainless steel, copper, or other metals, or of metal and polymer composite films, which may be configured as a tray. In one example, a thickness of each of the first tray structure 135-1 and the second tray structure 135-2 may be in the range of 25 microns to 100 microns, generally. Also, it is noted that if the thickness of the metal in the tray structure is too thin, the metal may include a plurality of pin holes, which allow the atmospheric pressure gas 116 to escape.

Figure 5D:
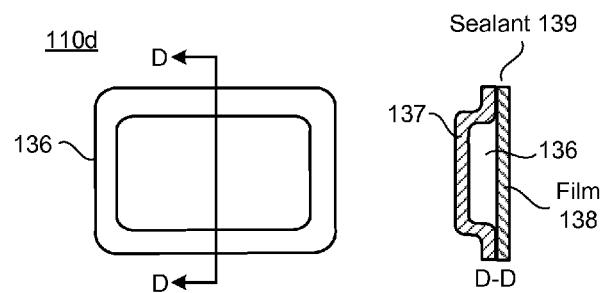
FIG. 5D illustrates a top view and a cross-sectional view of an insulator including a single tray structure covered with a film according to an embodiment.

FIG. 5D illustrates a top view and a cross-sectional view of an insulator 110d including a single tray structure 137 covered with a film 138 according to an embodiment. The left portion of FIG. 5D illustrates a top view of the insulator 110d, and the right portion of FIG. 5D illustrates a cross-sectional view taken across the line D-D. In one embodiment, the film 138 may be a non-metallic film such as any type of plastic material. Alternatively, the film 138 may be a metallic foil such as aluminum or stainless steel, for example. Similar to the first and second tray structures 135, the single tray structure 137 may include a stainless steel, aluminum, copper, or other metal tray, or metal-polymer composite that is arranged as a flat portion with raised edges. However, in this embodiment, only a single tray structure 137 is used. The film 138 may be heat-sealed to the single tray structure 137 using the sealant 139 such that a cavity 136 exists between the film 138 and the single tray structure 137, where the cavity 136 is filled with the one or more atmospheric pressure gases 116 having a thermal conductivity lower than air, as well as possibly the light gas 117.

Figure 5E:
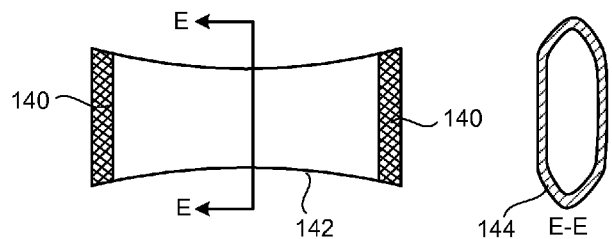
FIG. 5E illustrates a top view and a cross-sectional view of an insulator including a flexible tube structure having end seals according to an embodiment.

FIG. 5E illustrates a top view and a cross-sectional view of an insulator 110e including a flexible tube structure 144 (e.g., similar to toothpaste tubing) having end seals 140 according to an embodiment. The left side of FIG. 5E illustrates a top view of the insulator 110e, and the right side of FIG. 5E illustrates a cross-sectional view taken across the section line E-E. In this example, the tubing structure 144 may include a flexible tube material such as a polymer or polymer-metal material that is arranged in a circular form, where inside the tubing exists an initially circular cavity 142 that is filled with the atmospheric pressure gas 116 having a thermal conductivity lower than air. Both ends of the tubing structure 144 are sealed with the sealant 126 as shown with respect to the top view of the insulator 110E. The tube may be flattened in service to fit within the gap 103.

Figure 6:
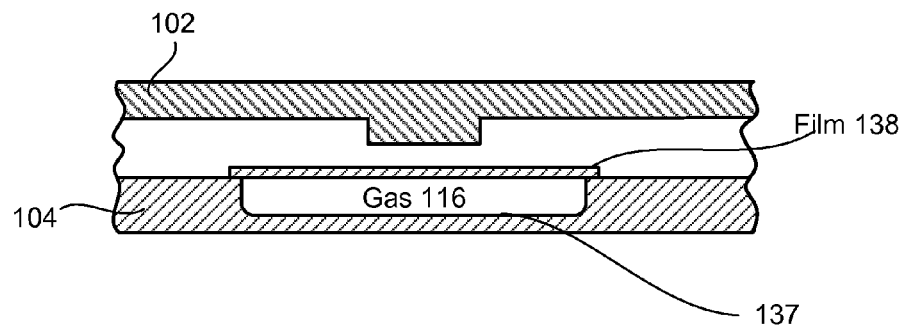
FIG. 6 illustrates the insulator of FIG. 5D at least partially embedded into the enclosure according to an embodiment.

FIG. 6 illustrates the insulator 110d of FIG. 5D at least partially embedded into the heat-absorbing component (e.g., the enclosure) according to an embodiment. For example, in FIG. 6, the insulator 110d may be at least partially embedded into the enclosure of the device. In particular, the single tray structure 137 may be embedded into the heat-absorbing component 104, e.g., the enclosure of a device. The film 138 may be provided over the surface of the heat-absorbing component 104, which encloses the single tray structure 137. It is also noted that the insulator 110c of FIG. 5C may be arranged in a similar manner, e.g., at least a portion of one of the first tray structure 135-1 and the second tray structure 135-2 may be embedded into the enclosure.

Figure 7:
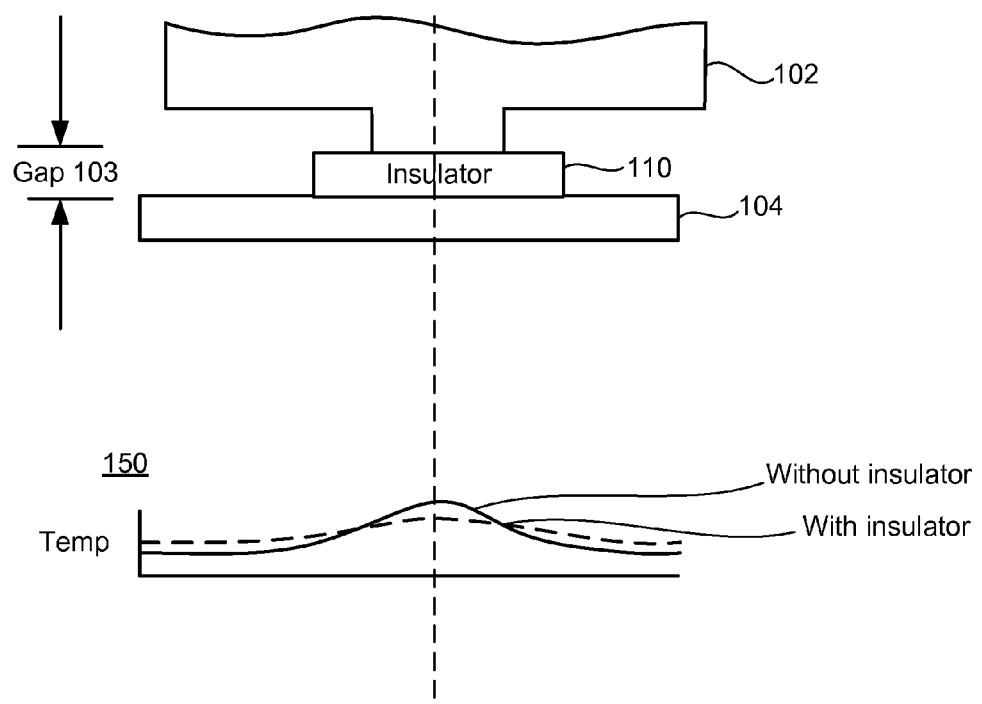
FIG. 7 illustrates a temperature distribution across a surface of the enclosure with and without the insulator according to an embodiment.

FIG. 7 illustrates a temperature distribution 150 across a surface of the heat-absorbing component 104 with and without the insulator 110 according to an embodiment. For example, in FIG. 7, the insulator 110 is provided within the gap 103 existing between the heat-generating component 102 and the heat-absorbing component 104. As shown in FIG. 7, the insulator 110 is effective for reducing the peak temperature on the surface of the heat-absorbing component 104, when the gap 103 is small enough such that conduction dominates heat transfer over radiation and convection. In contrast, filling the gap 103 with air, and without the insulator 110 of the embodiments may result in a higher surface temperature in the area of the hotspot.

Figure 8A:
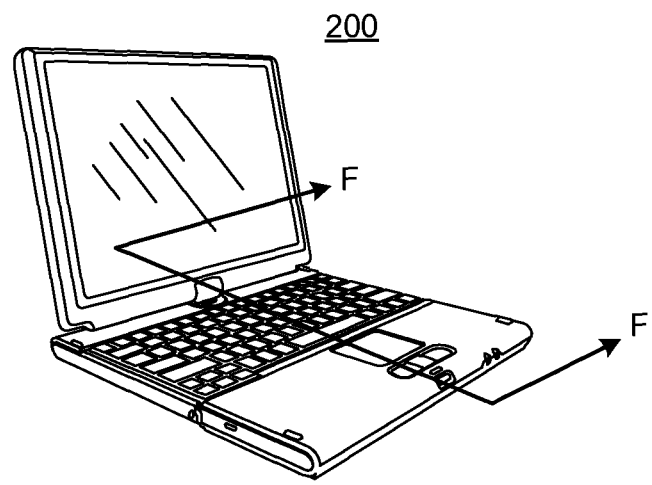
FIG. 8A illustrates a perspective of a laptop computer according to an embodiment.
Figure 8B:
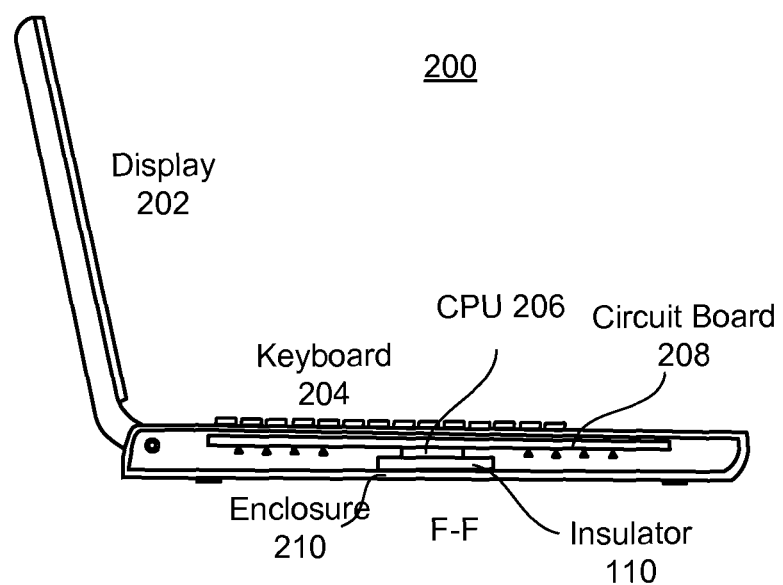
FIG. 8B illustrates a cross sectional view of the laptop computer depicting the insulator according to an embodiment.

FIG. 8A illustrates a perspective of a laptop computer 200, and FIG. 8B illustrates a cross sectional view of the laptop computer 200 taken across the section line F-F according to an embodiment. As shown in FIG. 8B, the laptop computer 200 may include a display 202, a keyboard portion 204, and an enclosure 210 housing a circuit board 208 having one or more CPUs 206. The enclosure 210 may be considered the heat-absorbing component 104, and the one or more CPUs 206 may be considered the heat-generating component 102, of the previous figures. A gap may exist between one or more CPUs 206 and an inner surface of the enclosure 210. According to the embodiments, the insulator 110 may be located, within the gap, between the CPU 206 and the inner surface of the enclosure 210. As indicated above, the insulator 110 may include the insulator structure 114 encompassing the atmospheric pressure gas 116 having a thermal conductivity lower than air. The insulator structure 114 may include a generic structure as discussed with reference to FIG. 4, or any of the more specific embodiments of FIGS. 5-6.

It will be appreciated that the above embodiments that have been described in particular detail are merely example or possible embodiments, and that there are many other combinations, additions, or alternatives that may be included.

What is claimed is:

1. A device comprising:
a heat-absorbing component;
one or more heat-generating components, at least one heat-generating component located in proximity to an inner surface of the heat-absorbing component, wherein a gap exists between the at least one heat-generating component and the inner surface of the heat-absorbing component, the gap having a length of less than one millimeter; and
an insulator, located in the gap, including a container, the container being separate from a frame of the device, the container being a flexible polymer-based pouch structure defining an internal cavity, the flexible polymer-based pouch structure including at least one layer of material coupled with itself or another layer with a sealant, the container enclosing atmospheric pressure gas within the internal cavity, the atmospheric pressure gas having a thermal conductivity lower than air, wherein a thickness of the insulator is less than one millimeter.

2. The device of claim 1, wherein the heat-absorbing component includes an enclosure of the device, and the at least one heat-generating component includes a computer processing unit (CPU) of the device.

3. The device of claim 1, wherein the at least one layer of material includes a first layer and a second layer, the first layer being a polymer-based layer, the second layer being a barrier layer, the barrier layer having a thickness of 7 to 25 microns.

4. The device of claim 1, wherein the at least one layer of material defines an inner surface, and a portion of the inner surface is coupled to another portion of the inner surface with the sealant.

5. The device of claim 1, wherein the at least one layer of material is folded in half with the sealant extending on three sides of the container.

6. The device of claim 1, wherein the at least one layer of material is bonded with another layer with the sealant extending on four sides of the container.

7. The device of claim 1, wherein the atmospheric pressure gas includes multiple gases including Xenon, Argon, and a light gas, the light gas being Helium or Hydrogen.

8. The device of claim 1, wherein at least a portion of the container is embedded in the enclosure.

9. The device of claim 1, wherein the atmospheric pressure gas includes xenon.

10. The device of claim 1, wherein the atmospheric pressure gas includes a primary atmospheric pressure gas having a thermal conductivity lower than air and a secondary atmospheric pressure gas having a thermal conductivity lower than air different than the primary atmospheric pressure gas, the secondary atmospheric pressure gas having a molecule size similar to at least one of oxygen and nitrogen such that the secondary atmospheric pressure gas permeates out of the container at a similar rate in which oxygen and nitrogen permeate inside the container, wherein a size of the container remains substantially the same over time as molecules of the secondary atmospheric pressure gas are replaced with molecules of at least one of oxygen and nitrogen within the internal cavity of the container.

11. The device of claim 10, wherein the thermal conductivity of the secondary atmospheric pressure gas is higher than the thermal conductivity of the primary atmospheric pressure gas.

12. The device of claim 1, wherein the at least one layer of material includes an outer polymer layer, a barrier layer, an inner polymer layer, and one or more adhesive or heat-sealed layers.

13. An insulator for a device, the insulator comprising:

a container separate from a frame of the device, the container having a size that fits within a gap existing between at least one heat-generating component and an inner surface of a heat-absorbing component, the gap having a length of less than one millimeter, the container being a flexible polymer-based pouch structure defining an internal cavity, the flexible polymer-based pouch structure including at least one layer of material coupled with itself with a sealant, the at least one layer of material including a polymer-based layer and a barrier layer, wherein a thickness of the container is in a range of 12-120 microns; and atmospheric pressure gas located within the internal cavity of the container, the atmospheric pressure gas having a thermal conductivity lower than air.

14. The insulator of claim 13, wherein the barrier layer is aluminum foil.

15. An insulator for a computing device, the insulator comprising:

a container that is separate from a frame of the computing device, the container being a flexible polymer-based pouch structure defining an internal cavity, the flexible polymer-based pouch structure including at least one layer of material coupled with itself with a sealant, the container having a size that fits within a gap existing between a computer processing unit (CPU) of the computing device and at least one heat-absorbing component, the gap having a length of less than one millimeter, the at least one layer of material including a polymer-based layer and an aluminum foil layer, the aluminum foil layer having a thickness in a range of 7 to 25 microns;

a primary atmospheric pressure gas disposed within the internal cavity of the container, the atmospheric pressure gas having a thermal conductivity lower than air; and a secondary atmospheric pressure gas disposed within the internal cavity of the container, the secondary atmospheric pressure gas being different than the primary atmospheric pressure gas.

16. The insulator of claim 15, wherein the aluminum foil layer is coupled to the polymer-based layer.

17. The insulator of claim 15, wherein the primary atmospheric pressure gas has a molecule size such that the primary atmospheric pressure gas permeates out of the container at a first permeation rate and the secondary atmospheric pressure gas has a molecule size such that the secondary atmospheric pressure gas permeates out of the container at a second permeation rate, the second permeation rate being higher than the first permeation rate such that the secondary atmospheric pressure gas leaks out of the container at a faster rate than the primary atmospheric pressure gas, wherein the molecule size of the secondary atmospheric pressure gas is similar to at least one of oxygen and nitrogen such that a size of the container remains substantially the same over time as molecules of the secondary atmospheric pressure gas are replaced with molecules of at least one of oxygen and nitrogen within the internal cavity of the container.

* * * * *